INVENTOR.
Howard I. Oshry
BY
ATTORNEY

United States Patent Office 3,259,837
Patented July 5, 1966

3,259,837
INDUCTION LOGGING APPARATUS UTILIZING PLURAL FREQUENCIES FOR INVESTIGATING DIFFERENT ZONES SURROUNDING A BOREHOLE
Howard I. Oshry, Houston, Tex., assignor to Dresser Industries, Inc., Dallas, Tex., a corporation of Delaware
Filed Feb. 5, 1963, Ser. No. 256,395
8 Claims. (Cl. 324—6)

This invention relates to induction logging of systems and, more particularly, to methods and apparatus for simultaneously investigating the earth formation conductivity in a plurality of different zones surrounding a borehole.

In induction logging systems, at least one alternating current energized transmitter-receiver coil system is lowered into a borehole such that the system provides a measure of earth formation conductivity. Early systems of this type are described in U.S. Patents Nos. 2,220,070 to Charles B. Aiken and 2,220,788 to Ralph W. Lohman. More recent improved induction logging systems are described in Patent Nos. 2,582,314 and 2,582,315 to Doll, wherein a plurailty of transmitter-receiver coil pairs are combined to form systems which confine the zone of investigation to certain desired regions spaced from the borehole and uninfluenced by highly conductive drilling fluid in the borehole.

These prior systems are characteristically single investigation types which can only provide a log indicating earth formation conductivity in a single zone surrounding the borehole. While single investigation logging systems provide much valuable information, the reliability of information regarding the oil and water saturation of the porous earth formation can be substantially increased by multiple investigation logs, i.e., logs derived by simultaneously measuring earth formation conductivity in a plurality of different concentric zones surrounding the borehole. Also, multiple investigation logs can be compared to provide significant information regarding permeability of the formation and the extent of drilling fluid invasion into the earth formation.

With the prior induction logging systems, it has been found extremely difficult to obtain meaningful multiple depth investigation logs. Running two successive logs is not satisfactory because of the time consumed, the expense involved and the difficulty of obtaining an exact depth correlation between the separate logs. Furthermore, the extent to which the drilling fluid invades the surrounding earth formation may change during the time interval between successive logs, thus changing measured conditions. Combining several induction logging systems in the same tool has not proved successful in the past because of the interference between the separate systems, the difficulty of correlating the logging data taken at different vertical depths in the borehole, and because the required length of the tool is greater than could be conveniently handled in the field.

Thus, an object of this invention is to provide a multiple depth investigation induction logging system for simultaneously measuring conductivity in a plurality of different concentric zones surrounding a borehole.

Another object is to provide a multiple depth investigation logging system where each of the induction logs are taken simultaneously and where all measurements are symmetrical with respect to the same horizontal plane passing through the borehole.

Still another object of this invention is to provide an induction logging method which provides more reliable information regarding the hydrocarbon content of the porous formation, and which can also provide significant information of formation permeability.

In essence, the multiple investigating logging apparatus in accordance with this invention includes a plurality of transmitter-receiver coil systems operating at different frequencies with suitably connected filter circuits eliminating the effect of unwanted interference between systems. The longitudinal separation between the principal transmitter coil and receiver coil in each coil system is selected to achieve the desired different lateral sensitivity characteristics so as to provide multiple depth investigation logs. Each of the coil systems can also include one or more auxilliary coils used to confine the zone of investigation, and, where possible, the principal coils of one system are used as the auxiliary coils in another system. The coils are preferably arranged to substantially eliminate mutual inductance between the transmitter coils and the receiver coils.

In accordance with the method of this invention, coil systems operating at different frequencies and having different lateral investigating characteristics are lowered into a borehole. The response of each such coil system is separately recorded as a function of vertical depth of the measuring apparatus within the borehole. The response of each individual coil system group is a measure of conductivity at a selected distance from the center of the borehole, such that valuable information is obtained related to earth formation permeability and hydrocarbon content.

The manner in which the aforementioned objects, as well as other objects, can be achieved, is better understood by referring to the following specification and drawings, the drawings forming part of the specification, and wherein.

Figures 2, 4:
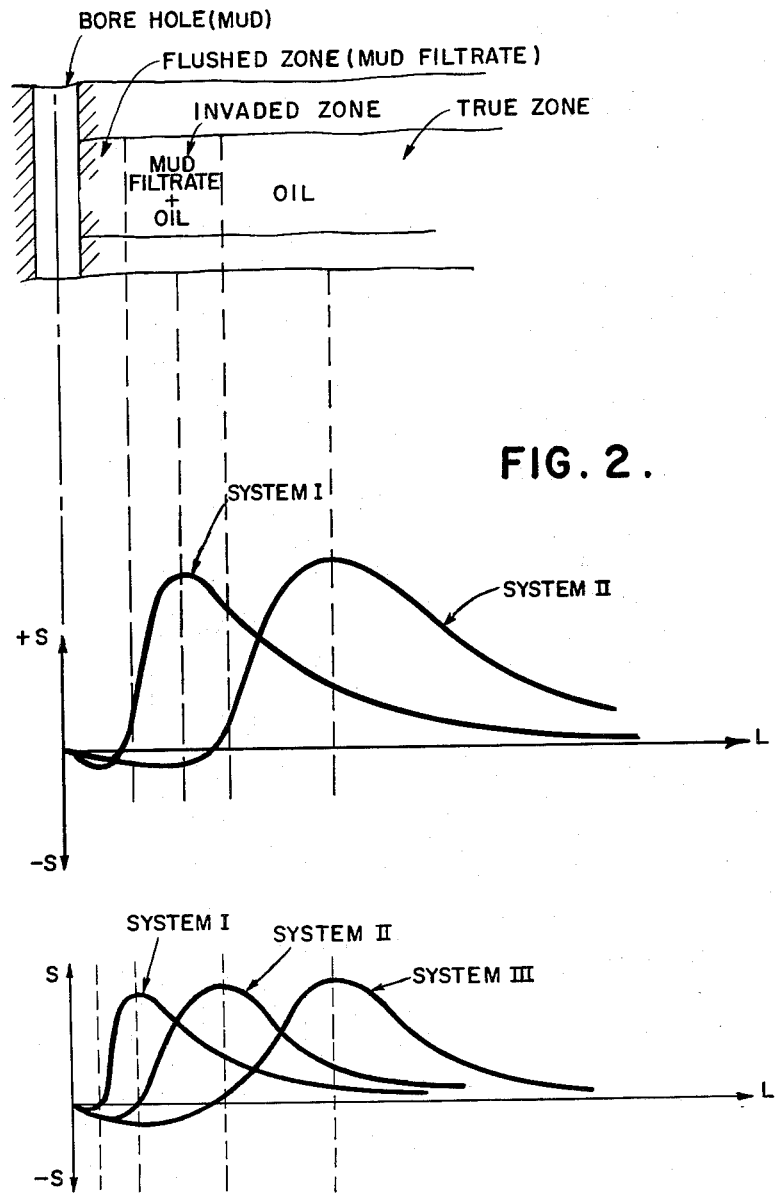
FIG. 2 is a diagram illustrating the lateral sensitivity characteristics of the coil systems shown in FIGS. 1a and 1b.
Figure 3:
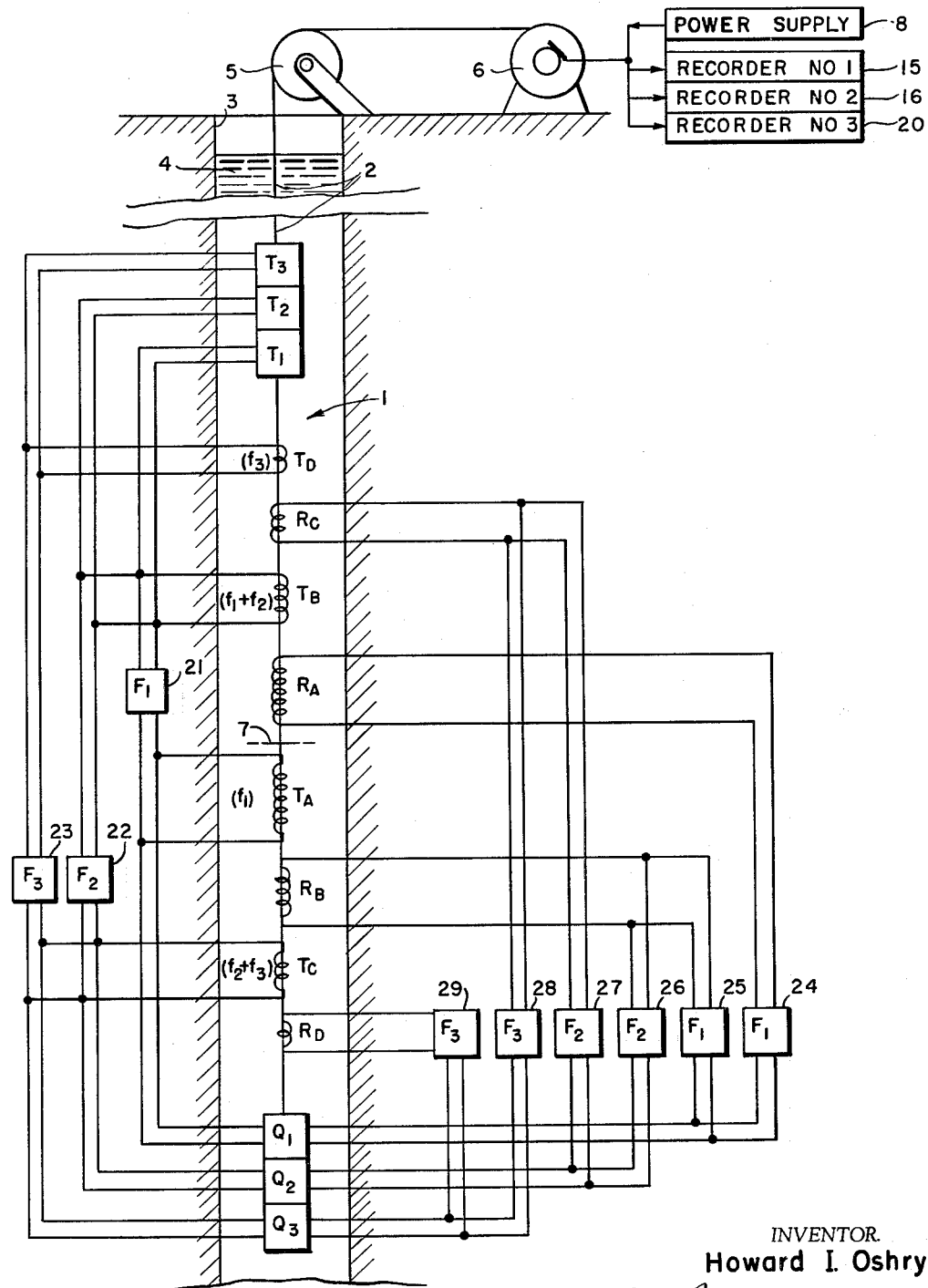
Figure 3A:
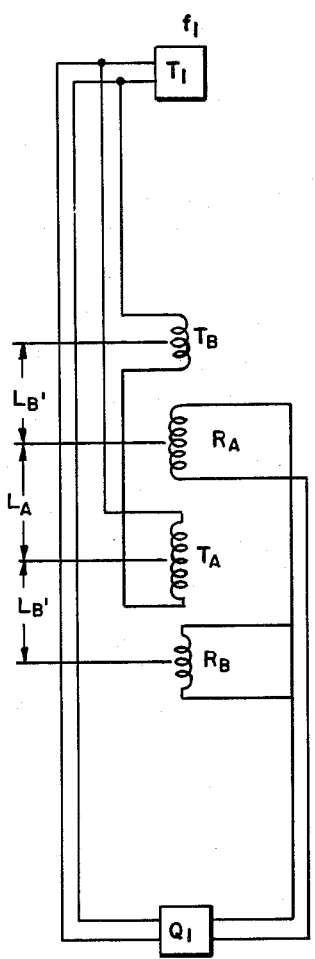
Figure 3B:
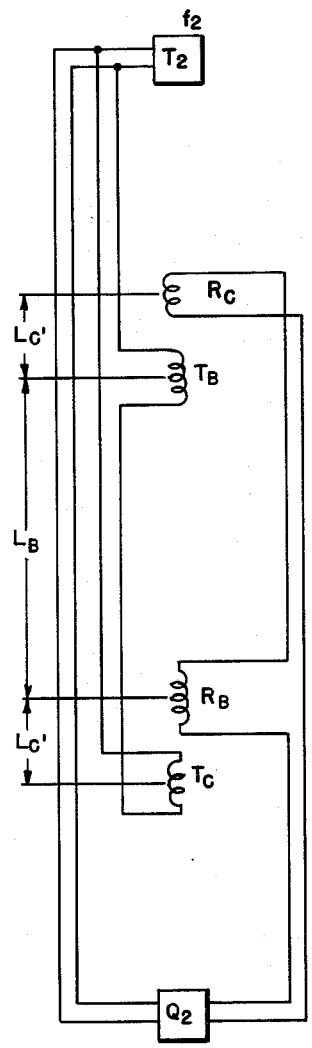
Figure 3C:
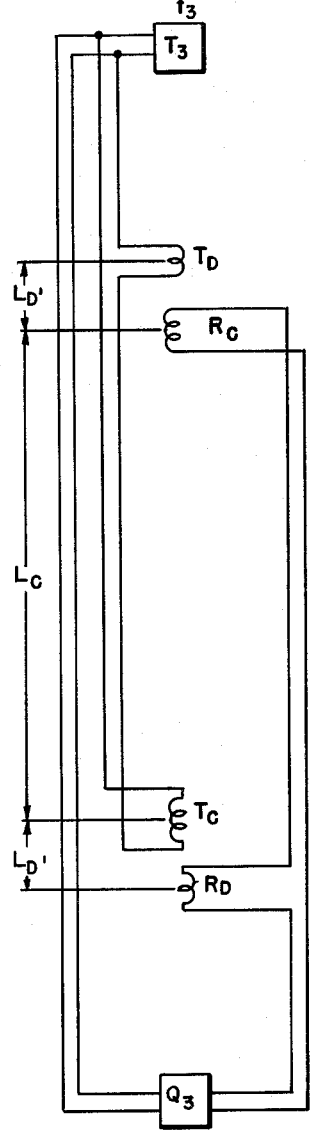

FIG. 3 schematically illustrates apparatus in accordance with another embodiment of this invention;

FIGS. 3a–3c are partial schematic diagrams illustrating the independently operating coil systems formed by the apparatus shown in FIG. 3; and FIG. 4 is a diagram illustrating the lateral sensitivity characteristics of the coil systems shown in FIGS. 3a–3c.

Figures 1, 1A, 1B:
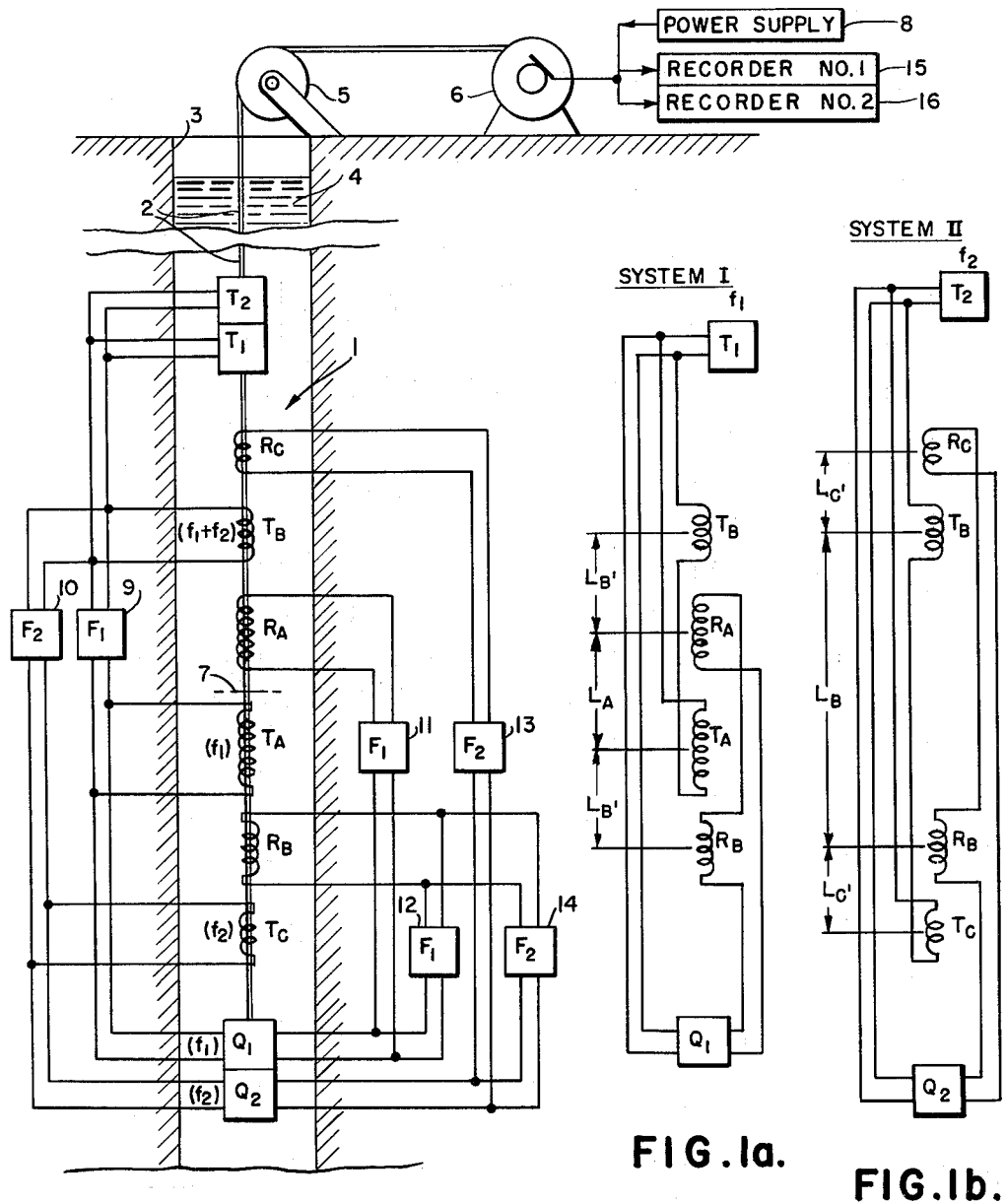
FIG. 1 is a schematic diagram of apparatus in accordance with one embodiment of the invention.
FIGS. 1a and 1b are partial schematic diagrams illustrating the independently operating coil systems formed by the apparatus shown in FIG. 1.

Referring first to FIG. 1, the subsurface logging unit 1 is shown schematically and is preferably housed in a single encapsulated cylindrical unit suspended on the end of a cable 2 extending to the surface of the earth. Cable 2 passes over a pulley 5 to a suitable winch 6 by means of which logging unit 1 is raised and lowered within a borehole 3 to selected desirable vertical depths. Borehole 3 may be empty, but is usually filled with a highly conductive drilling fluid 4. Preferably, unit 1 is provided with centering apparatus of conventional design which maintains the logging unit centered within the borehole.

Logging unit 1 includes six coaxially disposed coils wound side by side on a common mandrel to form three transmitter-receiver coil pairs. Each pair of coils is symmetrically disposed with respect to a center line 7, with the pair including a transmitter coil $T_A$ and a receiver coil $R_A$ being the innermost pair, and the pair including a transmitter coil $T_C$ and a receiver coil $R_C$ being the outermost pair. Transmitter coil $T_B$ of the remaining pair of coils is disposed between receiver coils $R_A$ and $R_C$, whereas the remaining receiver coil $R_B$ is disposed between transmitter coils $T_A$ and $T_C$.

The transmitter coils are energized by alternating current signals generated by transmitter units $T_1$ and $T_2$ which are included in logging unit 1. The transmitter units each include a separate oscillator energized by direct current power from power supply 8 located above ground, the transmitter units being connected to the power supply via suitable conductors (not shown) in cable 2 and via suitable slip rings on winch 6. Transmitter unit 1 is constructed to provide an alternating current signal having a frequency $f_1$ and transmitter unit $T_2$ is constructed to provide an alternating current signal having a frequency $f_2$. Preferably, frequencies $f_1$ and $f_2$ are in the 20-kilocycle range and should have a nonharmonic relationship, such as is provided if the frequencies are 17 kilocycles and 23 kilocycles, respectively.

Transmitter units $T_1$ and $T_2$ can be connected in any suitable manner such that transmitter coil $T_B$ is energized by both frequency $f_1$ and frequency $f_2$; transmitter coil $T_A$ and the reference signal input of a phase discriminator $\phi_1$ are energized only by a frequency $f_1$; and transmitter coil $T_C$ and the reference signal input of a phase discriminator unit $\phi_2$ are energized by the frequency $f_2$. This can be accomplished as shown, by connecting the output of both transmitter units to transmitter coil $T_B$ and to the inputs of a pair of band pass filters 9 and 10. Band pass filter 9 is constructed to pass frequencies $f_1$ and reject frequencies $f_2$ and therefore transmitter coil $T_A$ and phase detector $\phi_1$, connected to the output of band pass filter 9, are energized only by alternating current of frequency $f_1$. Band pass filter 10 is constructed to pass frequency $f_2$ and reject frequency $f_1$ and, therefore, transmitter coil $T_C$ and phase detector $\phi_2$, connected to the output of filter 10, are energized only by alternating current of frequency $f_2$.

When the transmitter coils are energized, each of the receiver coils has a frequency component $f_1$ and a frequency component $f_2$ induced therein. The receiver coils are connected to the inputs of phase detector units $\phi_1$ and $\phi_2$ such that the $f_1$ frequency components in receiver coils $R_A$ and $R_B$ are connected to the input of phase detector $\phi_1$, and such that the $f_2$ frequency components induced in receiver coils $R_B$ and $R_C$ are connected to the input of phase detector $\phi_2$. This can be accomplished by connecting receiver coils $R_A$ and $R_B$ to the input of phase detector $\phi_1$, respectively, via a pair of band pass filters 11 and 12, these filters being constructed to pass frequency $f_1$ and reject frequency $f_2$. Similarly, receiver coils $R_B$ and $R_C$ are connected to the input of phase detector $\phi_2$, respectively, via band pass filters 13 and 14, these filters being constructed to pass frequency $f_2$ and reject frequency $f_1$.

Phase detectors $\phi_1$ and $\phi_2$ are of conventional design and detect only the input signals which are in-phase with the applied reference signal. Furthermore, these phase detectors rectify the alternating current in-phase component and provide a varying direct current signal proportional to the alternating current signal magnitude. The direct current outputs from phase detectors $\phi_1$ and $\phi_2$ are connected, respectively, to above ground recorder units 15 and 16, these connections being via suitable conductors (not shown) in cable 2 and via suitable slip ring connections on winch 6. Recorder units 15 and 16 are preferably portions of the same two-channel recorder operative to record two separate signals on a single strip chart. The strip chart is advanced in synchronism with movement of cable 2, by apparatus (not shown) well known in the art, so that the strip chart position is always a function of the vertical position of logging unit 1. Thus, recorder unit 15 (No. 1) records the magnitude of the $f_1$ frequency components induced in receiver coils $R_A$ and $R_B$ as a function of vertical depth, and recorder 16 (No. 2) simultaneously records the magnitude of the $f_2$ frequency component induced in receiver coils $R_C$ and $R_B$ as a function of vertical depth.

There are two independently operating transmitter-receiver coil systems in logging unit 1. One of these systems is referred to as System I and, as illustrated in FIG. 1a, includes the coils operating at frequency $f_1$. Of these coils, coils $T_A$ and $R_A$, with a longitudinal separation distance $L_A$, are the principal coils, and coils $T_B$ and $R_B$, longitudinally spaced outside the principal coils by distances $L_{B'}$, are the auxiliary coils. The other system is referred to as System II and, as illustrated in FIG. 2b, includes the coils operating at frequency $f_2$. In System II, coils $T_B$ and $R_B$, with a longitudinal separation distance $L_B$ ($L_A+2L_{B'}$), are the principal coils, and coils $T_C$ and $R_C$, longitudinally spaced outside these principal coils by distances $L_{C'}$, are the auxiliary coils. The filter circuits have been eliminated in FIGS. 1a and 1b to clarify the illustration. It should be observed that transmitter coils $T_A$ and $T_B$ in System I are connected in series opposition, and that receiver coils $R_A$ and $R_B$ are similarly connected in series opposition. In like fashion, transmitter coils $T_B$ and $T_C$ in System II are connected in series opposition as are the associated receiver coils $R_B$ and $R_C$. Coils $R_B$ and $T_B$ are common to both systems.

The lateral sensitivity characteristics of transmitter-receiver coil Systems I and II are illustrated by the curves in FIG. 2. The lateral sensitivity of a transmitter-receiver coil system at a particular distance from the longitudinal axis thereof can be defined as the magnitude of the in-phase response of the system to a theoretical concentric cylindrical shell of unit thickness and unit conductivity having a radius equal to the particular distance. If the medium surrounding the coil system is homogeneous, the theoretical cylindrical shells of different radii each contribute a proportional amount, as detected by the receiving coils and as indicated by the respective curves. The total response is therefore proportional to the area under the corresponding curve. In actual practice, the surrounding medium would not be homogeneous, and therefore the curves would have a somewhat modified form, taking into consideration the individual conductivities of cylindrical shells at different radii.

The horizontal axis of the curves in FIG. 2 represents lateral distances from the longitudinal axis of the coil systems corresponding to the radii of the different cylindrical shells. The vertical axis is the relative sensitivity value of a coil system to cylindrical shells at the respective distances. The lateral sensitivity curve for System I rises rapidly from the origin, reaches a maximum sensitivity value and then falls off more slowly, becoming asymptotic to the horizontal axes. The distance from the longitudinal axis at which the curve reaches maximum sensitivity is determined primarily by the longitudinal separation distance $L_A$ of the principal coils whereas the shape of the curve is determined primarily by the position and the connections of the auxiliary coils relative to the principal coils. The shape of lateral sensitivity characteristic curves corresponding to various principal and auxiliary coil systems is treated in greater detail in Patent No. 2,582,314, issued to Henri-Georges Doll on January 15, 1952. The lateral sensitivity characteristic curve for System II has the same general shape as the curve for System I, except that the point of maximum sensitivity is more distant from the longitudinal axis due to the greater longitudinal separation distance $L_B$ between the principal coils of System II. The dimensions $L_{B'}$ and $L_{C'}$ are preferably less than dimensions $L_A$ and $L_B$, respectively, so that the auxiliary coils will effectively reduce sensitivity in the area adjacent the borehole.

In the upper portion of FIG. 2, a cross-section of the earth formation surrounding the borehole is shown. In most cases, the borehole is filled with a drilling fluid or drilling mud, which has a tendency to flow out of the borehole into the surrounding porous formation in the form of mud filtrate. In a first zone surrounding the borehole, referred to as the "flushed zone," the filtrate has completely replaced the original liquid in the formation, the original liquid in this case being oil. In a second zone, located at a greater lateral distance from the center of the borehole and referred to as the "invaded zone," the drilling fluid has only partially replaced the oil, and thus, in this zone a mixture of filtrate and oil is found. In a third zone, spaced still further from the center of the borehole and referred to as the "true zone," the oil in the earth formation has not been affected by the filtrate. The extent to which invasion of the drilling fluid has taken place is related primarily to the earth formation permeability and therefore the widths of the respective zones would vary accordingly. For the purposes of this specification, it is assumed that widths of the respective zones correspond to the maximum anticipated fluid invasion conditions.

By appropriate selection of coil separation distances, the lateral sensitivity characteristics of the coil systems can be related to the zones, as indicated in FIG. 2. More specifically, System II has a lateral sensitivity characteristic so that the system is primarily responsive to material lying in the "true zone" except where the formation is extremely permeable. The lateral sensitivity characteristic of System I is such that the system is either responsive to material lying in the "true zone" or, if the formation is relatively permeable, the system is responsive to material in the "invaded zone."

Under normal circumstances, System I and System II will measure conductivity in the "true zone" and, since there are two independent conductivity measurements, the information is recorded, and when examined, indicates the presence of oil or water in the earth formation. As the extent of invasion increases, System I begins to detect the highly conductive mud filtrate in the "invaded zone" and therefore, when System I measures a higher conductivity than System II, this is an indication of a highly permeable formation. System II still measures conductivity in the "true zone" and therefore provides the necessary information for determining the oil and water content of the formation. Under rare circumstances, where the formation is extremely permeable, it is possible that both systems will measure conductivity in the "invaded zone," and hence, unusual conductivity measurements by both systems will indicate this condition.

It is usually desirable to substantially eliminate the effect of direct mutual coupling between the transmitter coils and the receiver coils, since this coupling induces a quadrature component in the receiver coils which has no known investigating characteristics. The transmitter-receiver coil systems can be balanced by satisfying the following equation:

$$\sum_{t,r} \frac{(\pm S_t)(\pm S_r)}{(L_{t,r})^3} = 0 \qquad (1)$$

In making the summation, $t$ and $r$ range over all possible pairs of transmitter and receiver coils, $L_{t,r}$ is the longitudinal separated distance between any pair of coils being considered, $S_t$ is the total area of the particular transmitter coil being considered (the mean area of a single turn multiplied by the number of turns) and $S_r$ is the total area of the receiver coil being considered. Thus, the numerator of this relationship is the product of the total areas of the pairs of coils and the denominator is the cube of their separation distance. The signs in the numerator indicate the polarity of the windings of each coil. If a particular transmitter winding is taken as positive, then all other transmitter coils which are electrically connected in series opposition are taken as negative, and likewise with respect to the receiver coils.

In coil System I, shown in FIG. 1a, the coils are preferably wound on the same mandrel and therefore each have the same effective mean area. Also, it is desirable that the transmitter coil $T_A$ and receiver coil $R_A$ have the same number of turns so as to maintain symmetry about the center of the system; likewise for transmitter coil $T_B$ and $R_B$. Accordingly, the formula for achieving mutual balance for System I can be simplified as follows:

$$\frac{(N_A)^2}{(L_A)^3} - 2\frac{N_A N_B}{(L_{B'})^3} + \frac{(N_B)^2}{(L_A + 2L_{B'})^3} = 0 \qquad (2)$$

$N_A$ is the number of turns in coils $R_A$ and $T_A$, $N_B$ is the number of turns in coils $T_B$ and $R_B$, and $L_A$ and $L_B$, are the respective separation distances as indicated in FIG. 1a.

A similar relationship for obtaining mutual balance of System II (FIG. 1b) is as follows:

$$\frac{(N_B)^2}{(L_B)^3} - 2\frac{N_B N_C}{(L_{C'})^3} + \frac{(N_C)^2}{(L_B + 2L_{C'})^3} = 0 \qquad (3)$$

$N_B$ is the number of turns in coils $T_B$ and $R_B$, $N_C$ is the number of turns in coils $T_C$ and $R_C$, and $L_B$ and $L_C$ are the respective separation distances as indicated in FIG. 1b.

Satisfactory multiple interrogation induction logging results have been achieved by making the parameters equal to the following values:

| | |
|---|---|
| $L_A = 13.8''$ | $N_A = 232$ turns |
| $L_{B'} = 13.1''$ | $N_B = 100$ turns |
| $L_B = 40''$ | $N_C = 21$ turns |
| $L_{C'} = 30''$ | |

In accordance with this invention, it is possible to conduct more than two simultaneous investigations, if desired. The apparatus in FIG. 3 is essentially the same as that shown in FIG. 1, except that it is designed to conduct three simultaneous investigations which is accomplished by including an additional transmitter coil $T_D$, receiver coil $R_D$, transmitter unit $T_3$, and phase detector unit $\phi_3$. Transmitter coils $T_A$, $T_B$ and $T_C$ and receiver coils $R_A$, $R_B$ and $R_C$ as well as transmitter units $T_1$, $T_2$ and phase detector $\phi_2$ are essentially the same as previously described with regard to FIG. 1. Furthermore, the above surface apparatus is essentially the same, except for the addition of the third recorder unit 20 which is actually a third channel in the same recording unit including the recorder units 15 and 16.

Transmitter coil $T_D$ and receiver coil $R_D$ are coaxially disposed outside the other coils, and are symmetrical with respect to center line 7. Transmitter coil $T_D$ is adjacent receiver coil $R_C$ and receiver coil $R_D$ is adjacent transmitter coil $D_C$. Transmitter units $T_1$, $T_2$ and $T_3$ are all energized from power supply 8 via suitable conductors (not shown) in cable 2, and provide, respectively, alternating current signals of frequencies $f_1$, $f_2$ and $f_3$. The transmitter units are interconnected with the various transmitter coils such that coil $T_A$ is energized only with frequency $f_1$, coil $T_B$ is energized with frequency $f_1$ and frequency $f_2$, transmitter coil $T_C$ is energized with frequency $f_2$ and frequency $f_3$, and transmitter coil $T_D$ is energized only with frequency $f_3$. This can be accomplished by any suitable circuit connections, but, as shown, transmitter unit $T_1$ is connected to coil $T_B$ and to the input of a band pass filter 21. Transmitter unit $T_2$ is connected to transmitter coil $T_B$ and to the input of a band pass filter 22, whereas transmitter unit $T_3$ is connected to transmitter coil $T_D$ and to the input to a band pass filter 23. Band pass filter 21 passes only the frequency $f_1$ and rejects frequencies $f_2$ and $f_3$, and therefore transmitter coil $T_A$ and the reference signal input to phase detector $\phi_1$, connected to the output of band pass filter 21, are energized only by frequency $f_1$. Similarly, band pass filters 22 and 23 are designed to pass, respectively, frequencies $f_2$ and $f_3$ and reject all other frequencies. Accordingly, the reference signal input of phase detector $\phi_2$ and transmitter coil $T_C$, connected to the output of band pass filter 22, are energized at a frequency $f_2$, and the reference signal input of phase detector $\phi_3$ and transmitter coil $T_C$, connected to the output of band pass filter 23, are energized at a frequency $f_3$.

The $f_1$ frequency component induced in receiver coils $R_A$ and $R_B$ is supplied to the input of phase detector $\phi_1$ via band pass filters 24 and 25, respectively, these filters being constructed to pass only the frequency $f_1$. The $f_2$ frequency component induced in receiver coils $R_B$ and $R_C$ is similarly connected to the input of phase detector unit $\phi_2$ via suitable band pass filters 26 and 27, these filters being constructed to pass only the frequency $f_2$. In like fashion, the $f_3$ frequency component induced in receiver coils $R_C$ and $R_D$ is supplied to the input of phase detector $\phi_3$ via band pass filters 28 and 29 which pass only the frequency $f_3$.

There are three independently operating transmitter-receiver coil systems, each operating at a different frequency. These systems are designated System I, System II and System III, the relationship of the coils within each system being shown, respectively, in FIGS. 3a, 3b and 3c. Systems I and II, shown in FIGS. 3a and 3b and operating, respectively, at frequencies $f_1$ and $f_2$, are the same as those previously described with regard to FIGS. 1a and 1b, these systems having transmitter coil $T_B$ and the receiver coil $R_B$ in common. System III, shown in FIG. 3c, includes transmitter coil $T_D$ and receiver coil $R_D$ in addition to transmitter coil $T_C$ and receiver coil $R_C$, the latter two coils being common in Systems II and III. Coils $T_C$ and $R_C$ are the principal coils of System III and have a longitudinal separation distance of $L_C$, whereas coils $T_D$ and $R_D$ are the auxiliary coils longitudinally spaced outside the principal coils by distances $L_{D'}$.

The lateral sensitivity characteristics for Systems I and II are shown in FIG. 4, and are derived in the same manner as described for like curves in FIG. 2. The lateral sensitivity characteristic for System III has essentially the same shape as those for the other systems, but the point of maximum sensitivity is further from the borehole because of the greater longitudinal separation distance $L_C$ of the principal coils thereof. Thus, Systems I, II and III can be made primarily responsive to material lying at three selected distances from the center of the borehole by appropriate selection of longitudinal separation distances $L_A$, $L_B$ and $L_C$ between the three sets of principal coils. The zone investigated by each system can be confined to a desired region by appropriate placing of the auxiliary coils.

Mutual balance between the transmitter coils and receiver coils of each system can be achieved by satisfying Equation 1. More specifically, System I in FIG. 3a and System II in FIG. 3b can be mutually balanced by satisfying, respectively, Equations 2 and 3, previously set forth. System III in FIG. 3c is balanced by satisfying a similar equation, as follows:

$$\frac{(N_C)^2}{(L_C)^3} - 2\frac{N_C N_D}{(L_{D'})^3} + \frac{(N_D)^2}{(L_C + 2L_{D'})^3} = 0 \qquad (4)$$

$N_C$ is the number of turns in the coils $T_C$ and $R_C$, $N_D$ is the number of turns in the coils $T_D$ and $R_D$, and $L_C$ and $L_D$ are the respective longitudinal separations as illustrated in FIG. 3c.

While only a few illustrative embodiments of the invention have been described in detail, it should be obvious that there are a large number of other possible embodiments within the scope of this invention. The invention is more particularly defined in the appended claims.

What is claimed is:

1. Multiple investigation induction logging apparatus comprising
    at least first, second, and third transmitter-receiver coil pairs adapted for movement through a borehole, said coil pairs
        being disposed in a fixed relation to one another, and each having different lateral separation between the transmitter coil and the receiver coil;
    electrical circuit means for energizing the transmitter coils of said first and second coil pairs forming a first symmetrical group of four transmitter-receiver mutual inductances with alternating current of one frequency and for energizing the transmitter coils of said second and third coil pairs forming a second symmetrical group of four transmitter-receiver mutual inductances with alternating current of another frequency;
    means for detecting and indicating the resultant response of the receiver coils of said first and second coil pairs at said one frequency; and
    means for detecting and indicating the resultant response of the receiver coils of said second and third coil pairs at said other frequency.

2. Apparatus in accordance with claim 1 wherein
    the transmitter and receiver coils, respectively, of said first and second coil pairs are connected in series opposition for operation at said one frequency to form a first transmitter-receiver coil system of four transmitter-receiver mutual inductances having a particular zone of investigation; and
    the transmitter and receiver coils, respectively, of said second and third coil pairs are connected in series opposition for operation at said other frequency to form a second transmitter-receiver coil system of four transmitter-receiver mutual inductances having a different zone of investigation.

3. Apparatus in accordance with claim 1 wherein the coils are arranged so that the algebraic sum of all the transmitter-receiver mutual inductances in each group of transmitter-receiver mutual inductances is substantially zero.

4. Dual investigation induction logging apparatus comprising
    three transmitter coils and three corresponding receiver coils, said coils being coaxially disposed and adapted for movement through a borehole;
    first and second circuit means for interconnecting said coils to provide two coil systems operating independently at different frequencies and operative to investigate different zones concentric to the borehole each coil system having at least four symmetrical transmitter-receiver mutual inductances;
    each of said circuit means including
        a transmitter circuit for interconnecting a different pair of transmitter coils in series opposition and for energizing the same with alternating current of a frequency appropriate for the system, and
        a detector circuit for interconnecting the corresponding receiver coils in series opposition and detecting the component induced therein which is in phase with the energizing alternating current applied to the corresponding transmitter coils; and
    recorder means for separately indicating the magnitudes of said detected components.

5. Induction logging apparatus for investigating three different zones surrounding a borehole, comprising
    four transmitter coils and four corresponding receiver coils, said coils being coaxially disposed side by side and adapted for movement through the borehole;
    first, second and third circuit means for interconnecting said coils to provide three coil systems each having at least four transmitter-receiver mutual inductances, each operating independently at a different frequency and being operative to investigate a different zone concentric to the borehole;
    each of said circuit means including
        a transmitter circuit for interconnecting a different pair of transmitter coils in series opposition and for energizing the same with alternating current of a frequency appropriate for the system, and
        a detector circuit for interconnecting the corresponding receiver coils in series opposition and detecting the component induced therein which is in phase with the energizing alternating current applied to the corresponding transmitter coils; and
    recorder means for separately indicating the magnitudes of said detected components.

6. Multiple investigation induction logging apparatus comprising:
    a plurality of coaxially disposed transmitter coils and a plurality of coaxially disposed receiver coils adapted for movement through a borehole;

circuit means for energizing a first group of the transmitter coils at a first frequency and a different group of transmitter coils at a second frequency with at least one of the transmitter coils being included in both groups;

circuit means for detecting the resultant response of a first group of receiver coils at the first frequency and detecting the resultant response of a different group of receiver coils at the second frequency with at least one of the receiver coils being included in both groups.

7. Multiple investigation induction logging apparatus comprising:

a plurality of coaxially disposed transmitter coils and a plurality of coaxially disposed receiver coils adapted for movement through a borehole;

circuit means for energizing a first group of the transmitter coils at a first frequency and a different group of the transmitter coils at a second frequency with at least one of the transmitter coils being included in both groups;

circuit means for detecting the resultant response of certain of the receiver coils at the first frequency and detecting the resultant response of certain of the receiver coils at the second frequency.

8. Multiple investigation induction logging apparatus comprising:

a plurality of coaxially disposed transmitter coils and a plurality of coaxially disposed receiver coils adapted for movement through a borehole;

circuit means for energizing certain of the transmitter coils at a first frequency and energizing certain of the transmitter coils at a second frequency;

circuit means for detecting resultant response of a first group of the receiver coils at the first frequency and detecting the resultant response of a different group of the receiver coils at the second frequency with at least one receiver coil being included in both groups.

References Cited by the Examiner

UNITED STATES PATENTS

| | | | |
|---|---|---|---|
| 2,393,009 | 1/1946 | Chun | 324—1 |
| 2,398,761 | 4/1946 | Aiken | 324—1 |
| 2,582,314 | 1/1952 | Doll | 324—6 |
| 2,582,315 | 1/1952 | Doll | 324—6 |
| 2,623,924 | 12/1952 | Cartier et al. | 324—6 X |
| 2,790,138 | 4/1957 | Poupon | 324—6 |
| 3,052,835 | 9/1962 | Dunlap et al. | 324—6 X |

WALTER L. CARLSON, *Primary Examiner.*

G. R. STRECKER, *Assistant Examiner.*